US010534461B2

(12) United States Patent
Xiao et al.

(10) Patent No.: US 10,534,461 B2
(45) Date of Patent: Jan. 14, 2020

(54) IN-CELL TOUCH SUBSTRATE AND METHOD FOR DRIVING THE SAME, DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenjun Xiao, Beijing (CN); Chunlei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/658,870

(22) Filed: Jul. 25, 2017

(65) Prior Publication Data
US 2018/0032191 A1  Feb. 1, 2018

(30) Foreign Application Priority Data

Jul. 26, 2016 (CN) .......................... 2016 1 0596955

(51) Int. Cl.
*G06F 3/041* (2006.01)
*G06F 3/044* (2006.01)
*G09G 3/36* (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/0412; G06F 3/0416; G06F 3/044; G06F 2203/04111; G09G 3/36; G09G 2320/0233
See application file for complete search history.

(56) References Cited

U.S. PATENT DOCUMENTS 9,946,414 B2 *  4/2018 Wang ...................... G06F 3/044
9,965,065 B2 *  5/2018 Zhang .................... G06F 3/041
(Continued)

FOREIGN PATENT DOCUMENTS

CN   103793118 A   5/2014
CN   104699351 A   6/2015
(Continued)

OTHER PUBLICATIONS

First office action of corresponding CN 201610596955.7 dated Sep. 29, 2018, and English Translation.

*Primary Examiner* — Ricardo Osorio
(74) *Attorney, Agent, or Firm* — Nath, Goldberg & Meyer; Joshua B. Goldberg

(57) ABSTRACT

An in-cell touch substrate and a method for driving the same, and a display panel are provided. The in-cell touch substrate comprises a plurality of common electrodes time-division multiplexed as touch electrodes and a plurality of touch signal lines, each of the touch electrodes is stacked with at least one of the touch signal lines, a first insulation layer is provided between said each of the touch electrodes and the at least one of the touch signal lines, said each of the touch electrodes is electrically connected with one of the at least one of the touch signal lines through a first via hole in the first insulation layer, and is also stacked with at least one redundant line, redundant lines stacked with different touch electrodes are insulated with each other, said each of the touch electrodes is electrically connected with all of the at least one redundant line.

13 Claims, 2 Drawing Sheets

(52) U.S. Cl.
 CPC ...... *G06F 2203/04111* (2013.01); *G09G 3/36* (2013.01); *G09G 2320/0233* (2013.01)

(56) References Cited

U.S. PATENT DOCUMENTS

| | | | |
|---|---|---|---|
| 9,971,437 B2* | 5/2018 | Zhang | G06F 3/0412 |
| 9,996,208 B2* | 6/2018 | Xie | G06F 3/0416 |
| 2014/0118277 A1 | 5/2014 | Kim et al. | |
| 2016/0026290 A1* | 1/2016 | Liu | G06F 3/0412 |
| | | | 345/174 |
| 2016/0062164 A1 | 3/2016 | Chae et al. | |
| 2016/0099232 A1* | 4/2016 | Hatori | H01L 25/0657 |
| | | | 257/778 |
| 2016/0117031 A1* | 4/2016 | Han | G06F 3/0412 |
| | | | 345/174 |
| 2016/0162087 A1* | 6/2016 | Lee | G02F 1/13338 |
| | | | 345/173 |
| 2016/0202789 A1* | 7/2016 | Kim | G06F 3/044 |
| | | | 345/174 |
| 2016/0291749 A1 | 10/2016 | Zhou et al. | |
| 2016/0327835 A1 | 11/2016 | Xie et al. | |
| 2016/0378254 A1* | 12/2016 | Wang | G06F 3/044 |
| | | | 345/174 |
| 2017/0090635 A1* | 3/2017 | Kim | G06F 3/0412 |
| 2017/0090636 A1 | 3/2017 | Ding et al. | |
| 2018/0188858 A1* | 7/2018 | Zhang | G06F 3/0412 |

FOREIGN PATENT DOCUMENTS

| | | |
|---|---|---|
| CN | 104793386 A | 7/2015 |
| CN | 105759482 A | 7/2016 |

\* cited by examiner

IN-CELL TOUCH SUBSTRATE AND METHOD FOR DRIVING THE SAME, DISPLAY PANEL

CROSS-REFERENCE TO RELATED APPLICATIONS

The present application claims the priority of Chinese Patent Application No. 201610596955.7, filed on Jul. 26, 2016, the contents of which are incorporated herein in their entirety by reference.

TECHNICAL FIELD

The present disclosure relates to a field of touch technology, and particularly, relates to an in-cell touch substrate and a method for driving the same, a display panel.

BACKGROUND

A substrate (e.g., array substrate) of a display panel also may function as a touch substrate (i.e., in-cell touch substrate). However, there is a problem that the in-cell touch substrate of prior art will cause non-uniform display of the display panel.

SUMMARY

In order to solve the problem that the in-cell touch substrate of prior art will cause non-uniform display of the display panel at least partially, the present disclosure provides an in-cell touch substrate and a method for driving the same, a display panel, which can ensure uniform display of the display panel.

One technical solution of the present disclosure is an in-cell touch substrate comprising a plurality of common electrodes which are time-division multiplexed as touch electrodes and a plurality of touch signal lines, each of the touch electrodes is stacked with at least one of the touch signal lines, a first insulation layer is provided between said each of the touch electrodes and the at least one of the touch signal lines stacked with said each of the touch electrodes, said each of the touch electrodes is electrically connected with one of the at least one of the touch signal lines stacked with said each of the touch electrodes through a first via hole in the first insulation layer, said each of the touch electrodes is also stacked with at least one redundant line, redundant lines stacked with different touch electrodes are insulated with each other, and said each of the touch electrodes is electrically connected with all of the at least one redundant line stacked with said each of the touch electrodes.

Optionally, the redundant lines and the touch signal lines are provided in a same layer.

Further optionally, a second insulation layer is provided between said each of the touch electrodes and the at least one redundant line stacked with said each of the touch electrodes, said each of the touch electrodes is electrically connected with all of the at least one redundant line stacked with said each of the touch electrodes through a second via hole in the second insulation layer.

Optionally, said each of the touch electrodes is electrically connected with the one of the at least one of the touch signal lines stacked with said each of the touch electrodes through multiple first via holes in the first insulation layer.

Further optionally, said each of the touch electrodes is electrically connected with each of the at least one redundant line stacked with said each of the touch electrodes through multiple second via holes in the second insulation layer.

Optionally, all of the redundant lines and the touch signal lines are parallel to a first direction.

Further optionally, said each of the touch electrodes corresponds to multiple columns of pixels, and each column of the multiple columns of pixels includes a plurality of pixels provided along the first direction.

Further optionally, said each column of the multiple columns of pixels corresponding to said each of the touch electrodes corresponds to one of the at least one of the touch signal lines stacked with said each of the touch electrodes or corresponds to one of the at least one redundant line stacked with said each of the touch electrodes.

Optionally, a first opening is provided at a position of said each of the touch electrodes corresponding to the at least one of the touch signal lines stacked with said each of the touch electrodes.

Further optionally, a second opening is provided at a position of said each of the touch electrodes corresponding to the at least one redundant line stacked with said each of the touch electrodes.

Optionally, the in-cell touch substrate is an array substrate of a liquid crystal display panel.

Another technical solution of the present disclosure is a display panel comprising the in-cell touch substrate described above.

Still another technical solution of the present disclosure is a method for driving the in-cell touch substrate described above, the method comprises steps of: during a display stage, applying a common electrode signal to the touch signal lines; and during a touch stage, applying a touch driving signal to the touch signal lines.

In the in-cell touch substrate of the present disclosure, the redundant lines are electrically connected with the touch electrodes correspondingly, but the redundant lines electrically connected with different touch electrodes are insulated with each other, thus a signal of each of the redundant lines comes from the touch electrode stacked with said each of the redundant lines, and more essentially, comes from the touch signal line electrically connected with the touch electrode, therefore, the in-cell touch substrate of the present disclosure can ensure synchronization of signals of the redundant lines and the touch signal lines without providing additional touch chips (i.e., without increasing cost), so that an uniform display is achieved by the display panel of the present disclosure.

DESCRIPTION OF EMBODIMENTS

In order to make a person skilled in the art understand technical solutions of the present disclosure better, the present disclosure will be described in detail below in conjunction with accompanying drawings and specific embodiments.

In descriptions below, "A and B are provided in a same layer" refers to that A and B are formed of a same material layer by a patterning process (e.g., including one or more steps of forming a complete material layer on a base substrate, coating photoresist thereon, performing exposure, developing, etching, stripping off the photoresist, and so on), thus they belong to a same layer, but it does not mean that a distance between A and the base substrate and a distance between B and the base substrate must be equal to each other.

First Embodiment

Figure 1:
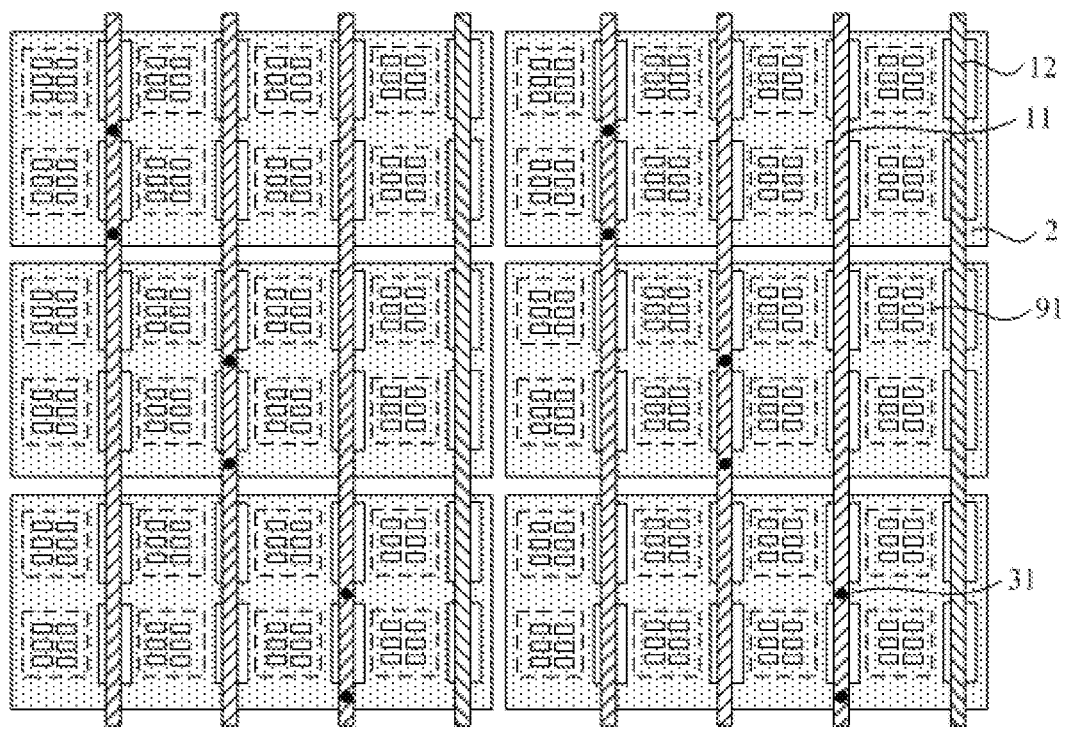
FIG. 1 shows a top view of structure of an in-cell touch substrate.
Figure 3:
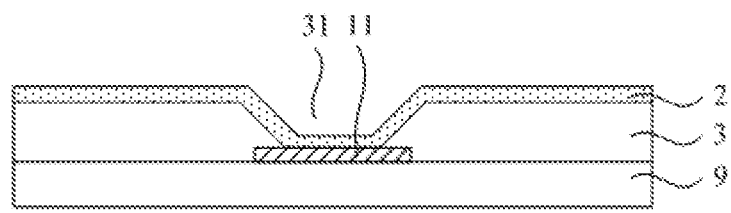
FIG. 3 shows a partial cross-sectional view of the in-cell touch substrate in FIG. 2 at a first via hole.

FIG. 1 shows a top view of structure of an in-cell touch substrate. As shown in FIG. 1, the in-cell touch substrate comprises a plurality of electrodes, each of the electrodes is stacked with at least one touch signal line 11 (a first insulation layer 3 is provided therebetween, as shown in FIG. 3), and is electrically connected with one of the at least one touch signal line 11 stacked with said each of the electrodes through a first via hole 31 in the first insulation layer 3, each touch signal line 11 is connected with a touch chip. During a display stage, each touch signal line 11 provides a common voltage to the electrode electrically connected thereto, the electrode functions as a common electrode. During a touch stage, each touch signal line 11 provides a touch driving signal to the electrode electrically connected thereto and receives a feedback signal, the electrode functions as a touch electrode 2. That is, the electrodes are time-division multiplexed as common electrodes and touch electrodes 2. In order to ensure initial self-capacitances of the touch electrodes 2 being the same with each other, each touch signal line 11 traverses the in-cell touch substrate, thus the touch signal lines 11 stacked with each touch electrode 2 of a same column are the same in number thereof, and simultaneously, each touch electrode 2 corresponds to multiple columns of pixels 91 (each pixel 91 may comprise a plurality of sub-pixels).

In this in-cell touch substrate, the number of the columns of the pixels 91 corresponding to each touch electrode 2 is generally larger than the number of the touch signal lines 11 stacked with said each touch electrode 2, thus there is a possible condition where a portion of the pixels 91 are provided with the touch signal lines 11 besides them and no touch signal line 11 is provided beside others of the pixels 91. Since the touch signal line 11 will affect the pixels 91 adjacent thereto, the display effect of the pixels 91 adjacent to the touch signal line 11 is different from that of the pixels 91 not adjacent to the touch signal line 11, resulting in non-uniform display of a display panel.

In order to solve this problem at least partially, redundant lines 12 in the same layer as the touch signal lines 11 may be provided additionally beside the pixels 91 not adjacent to the touch signal line 11, the redundant lines 12 are connected with a common electrode bar (Vcom) to provide the common voltage during the display stage, so as to avoid non-uniform display of the display panel.

However, in this case, the signal source of the redundant lines 12 is different from that of the touch signal lines 11, the actual voltages of the redundant line 12 and the touch signal line 11 during the display stage may be different (i.e., unsynchronized), still resulting in non-uniform display of the display panel (e.g., a light leak may occur at the redundant lines 12).

It should be understood that, in actual in-cell touch substrate, the redundant lines, the touch signal lines, the via holes, etc. may be located below the touch electrodes, thus they are invisible at positions overlapped with the touch electrodes, however, in order to clearly show their structures, parts of them below the touch electrodes are also shown in the drawings.

It should be understood that, the in-cell touch substrate may further comprise other structures such as a pixel electrode, a data line, a gate line, a thin film transistor, a gate insulation layer and so on, since these structures may be of conventional forms, they are not shown in the drawings.

Figure 2:
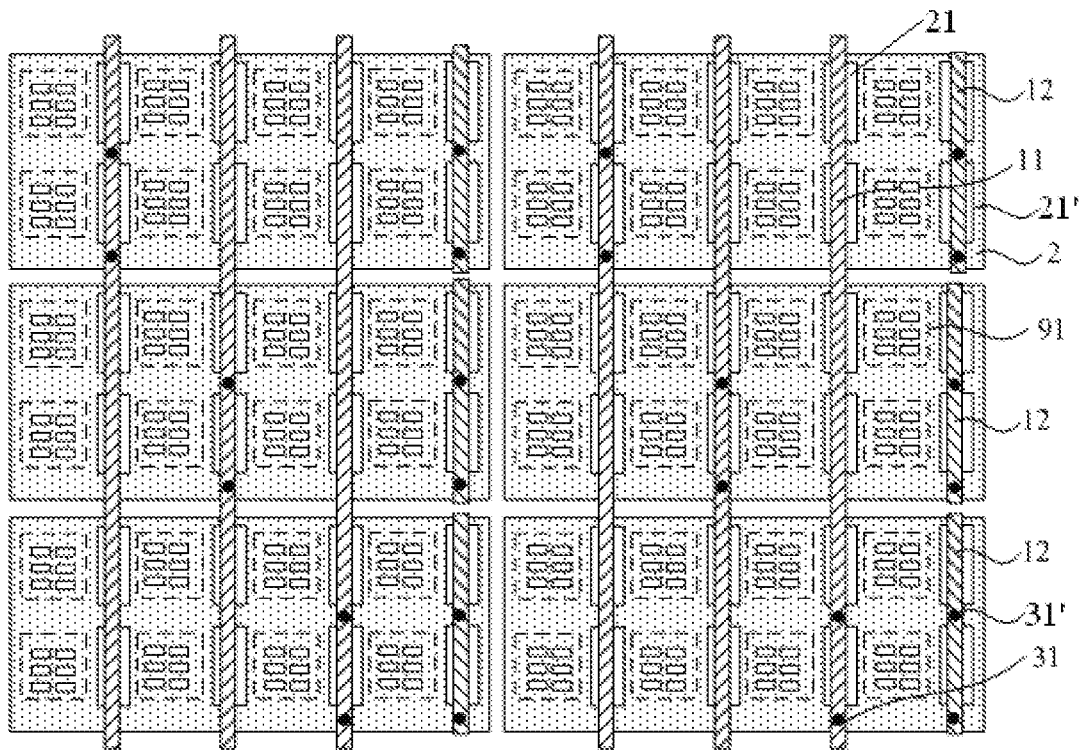
FIG. 2 shows a top view of structure of another in-cell touch substrate.

FIG. 2 shows a top view of structure of another in-cell touch substrate, this in-cell touch substrate is a substrate of a display panel but also can achieve a touch function.

As an example, the in-cell touch substrate of FIG. 2 may be an array substrate of a liquid crystal display panel, thus can comprise structures such as a pixel electrode, a data line, a gate line, a thin film transistor, a gate insulation layer and so on, which will not be described in detail herein. Certainly, the in-cell touch substrate also may be of other forms such as a color filter substrate and so on.

Figure 4:
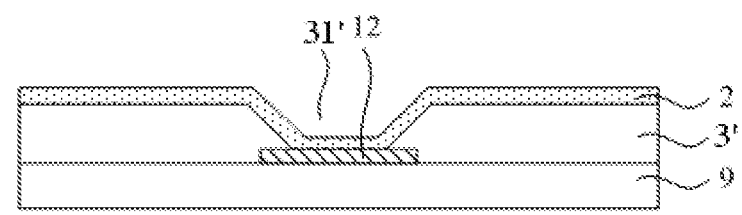
FIG. 4 shows a partial cross-sectional view of the in-cell touch substrate in FIG. 2 at a second via hole.

As shown in FIGS. 2 and 4, the in-cell touch substrate of FIG. 2 comprises a plurality of common electrodes which are time-division multiplexed as touch electrodes 2 and a plurality of touch signal lines 11, each of the touch electrodes 2 is stacked with at least one of the touch signal lines 11, a first insulation layer 3 is provided between said each of the touch electrodes 2 and the at least one of the touch signal lines 11 stacked with said each of the touch electrodes 2, said each of the touch electrode 2 is electrically connected with one of the at least one of the touch signal lines 11 stacked with said each of the touch electrode 2 through a first via hole 31 in the first insulation layer 3.

As an example, the common electrodes may be provided in the array substrate so that they are more distant from the base substrate of the array substrate than the pixel electrode. The common electrodes may be in form of slit electrodes (i.e., a plurality of slits are provided at positions of the common electrodes adjacent to sub-pixels). Certainly, the common electrodes also may be of other forms such as a plate-like electrode provided in the color filter substrate.

As shown in FIG. 3, for example, the touch signal lines 11 may be provided in the same layer as data lines in the array substrate, thus the touch signal lines 11 are closer to the base substrate 9 of the array substrate than the touch electrodes 2. Certainly, the touch signal lines 11 may also be of other forms.

As an example, each of the touch signal lines 11 may be electrically connected with only one of the touch electrodes 2.

As shown in FIGS. 2 and 4, in the in-cell touch substrate of FIG. 2, said each of the touch electrodes 2 is also stacked with at least one redundant line 12, redundant lines 12 stacked with different touch electrodes 2 are insulated with each other, and said each of the touch electrodes 2 is electrically connected with all of the at least one redundant line 12 stacked with said each of the touch electrodes 2.

Each redundant line 12 in the in-cell touch substrate of FIG. 2 is electrically connected with the touch electrode stacked with said each redundant line 12, which is different from the redundant lines 12 in the in-cell touch substrate of FIG. 1. Simultaneously, in the in-cell touch substrate of FIG. 2, redundant lines 12 stacked with different touch electrodes 2 are insulated with each other so that the different touch electrodes 2 are not electrically connected with each other, and in this case, the redundant lines 12 are not connected to the common electrode bar, the signal of each redundant line 12 comes from the touch electrode 2 stacked with said each redundant line 12, and more essentially, comes from the touch signal line 11 electrically connected with the touch electrode 2, in such a way, the in-cell touch substrate of FIG. 2 can ensure synchronization of signals of the redundant lines 12 and the touch signal lines 11 without providing additional touch chips (i.e., without increasing cost), so that an uniform display is achieved by the display panel.

As shown in FIG. 4, for example, a second insulation layer 3' is provided between said each of the touch electrodes 2 and the at least one redundant line 12 stacked with said each of the touch electrodes 2, said each of the touch electrodes 2 is electrically connected with all of the at least one redundant line 12 stacked with said each of the touch electrodes 2 through a second via hole 31' in the second insulation layer 3'.

Optionally, the redundant lines 12 and the touch signal lines 11 are provided in a same layer. In this case, in an aspect, there is no need for separate steps to provide the redundant lines 12, resulting in a simple process, and in another aspect, the redundant lines 12 and the touch signal lines 11 will affect display of the display panel to the same extent.

Optionally, said each of the touch electrodes 2 is electrically connected with the one of the at least one of the touch signal lines 11 stacked with said each of the touch electrodes 2 through multiple first via holes 31 in the first insulation layer 3, and said each of the touch electrodes 2 is electrically connected with each of the at least one redundant line 12 stacked with said each of the touch electrodes 2 through multiple second via holes 31' in the second insulation layer 3'.

Obviously, each touch electrode 2 may be electrically connected with one of the touch signal lines 11 stacked with said each touch electrode 2 through one first via hole 31 in the first insulation layer 3, but in order to improve connecting effect, each touch electrode 2 is preferably electrically connected with the one of the touch signal lines 11 stacked with said each touch electrode 2 through multiple first via holes 31 in the first insulation layer 3. Correspondingly, each touch electrode 2 may be electrically connected with each redundant line 12 stacked with said each touch electrode 2 through multiple second via holes 31' in the second insulation layer 3'.

Optionally, all of the redundant lines 12 and the touch signal lines 11 are parallel to a first direction.

Obviously, the redundant lines 12 and the touch signal lines 11 should be parallel to each other so that they affect display of the display panel to the same extent.

Further optionally, said each of the touch electrodes 2 corresponds to multiple columns of pixels 91, and each column of the multiple columns of pixels 91 includes a plurality of pixels 91 provided along the first direction.

That is to say, the pixels 91 are arranged in a matrix which includes a plurality of columns parallel to the redundant lines 12 (touch signal lines 11), for example, the first direction is the direction of the columns. Obviously, such arrangement of pixels 91 is advantageous to uniform correspondence between the pixels 91 and the redundant lines 12 (or the touch signal lines 11).

Further optionally, said each column of the multiple columns of pixels 91 corresponding to said each of the touch electrodes 2 corresponds to one of the at least one of the touch signal lines 11 stacked with said each of the touch electrodes 2 or corresponds to one of the at least one redundant line 12 stacked with said each of the touch electrodes 2.

Certainly, the pixels 91 and the redundant lines 12 (touch signal lines 11) may be correspondent with each other in other modes, for example, each row of pixels 91 may correspond to one redundant line 12 or one touch signal line 11, and in this case, for example, the first direction is the direction of the row. Alternatively, multiple columns of pixels 91 may correspond to one redundant line 12 or one touch signal line 11, or each column of sub-pixels may correspond to one redundant line 12 or one touch signal line 11, and so on.

As shown in FIG. 2, optionally, a first opening 21 is provided at a position of each touch electrode 2 corresponding to the touch signal lines 11 stacked with said each touch electrodes 2. With this configuration, an area on which the touch electrode 2 is facing to the touch signal line 11 is reduced, so that the load of the touch signal line 11 is also reduced. Correspondingly, a second opening 21' is provided at a position of each touch electrode 2 corresponding to the redundant lines 12 stacked with said each touch electrode 2 so as to ensure an uniform display of the display panel.

Certainly, in order to achieve more uniform display of the display panel, sizes, shapes, distributions etc. of the first openings 21 corresponding to the touch signal lines 11 and the second openings 21' corresponding to the redundant lines 12 should be as same as possible, and forms of the first openings 21 and the second openings 21' in different touch electrodes 2 should be as same as possible. In addition, widths, thicknesses etc. of the redundant lines 12 and the touch signal lines 11 also should be as same as possible, which will not be described in detail herein.

Second Embodiment

The present embodiment provides a display panel comprising the in-cell touch substrate described above.

The display panel of the present embodiment comprises the in-cell touch substrate described above, thus has a touch function, and will not produce non-uniform display.

Specifically, the in-cell touch substrate may be an array substrate, a color filter substrate, and so on.

Specifically, the display panel of the present embodiment may be any product or member with a display function, such as liquid crystal display panel, OLED panel, electronic paper, mobile phone, tablet computer, television, display, notebook computer, digital photo frame, navigator, and so on.

Third Embodiment

The present embodiment provides a method for driving the in-cell touch substrate described above, the method comprises steps of: during a display stage, applying a common electrode signal to the touch signal lines; and during a touch stage, applying a touch driving signal to the touch signal lines.

In the present embodiment, each redundant line is electrically connected with the touch electrode, and further the touch electrode is electrically connected with the touch signal line, thus when a signal is provided to the touch signal line, the redundant line is applied with the same signal via the touch electrode, there is no need to additionally provide a signal source for the redundant lines, therefore, the number of the touch chips is not increased (i.e., the cost is not increased), synchronization of signals of the redundant lines and the touch signal lines is ensured and an uniform display of the display panel is achieved.

Terms of "corresponding", "correspondence", "correspondent", "corresponds" and the like used herein refer to the relationship between any two objects that can be obtained by a person skilled in the art according to the context of the present disclosure or existing techniques, the relationship may include the mutual influence between any two objects, the positional relationship between any two objects, and so on.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. An in-cell touch substrate, comprising:
    a plurality of common electrodes which are time-division multiplexed as touch electrodes; and
    a plurality of touch signal lines,
    each of the touch electrodes is stacked with at least one of the touch signal lines, a first insulation layer is provided between said each of the touch electrodes and the at least one of the touch signal lines stacked with said each of the touch electrodes, and said each of the touch electrodes is electrically connected with one of the at least one of the touch signal lines stacked with said each of the touch electrodes through a first via hole in the first insulation layer,
    wherein said each of the touch electrodes is also stacked with at least one redundant line, redundant lines stacked with different touch electrodes are insulated with each other, and said each of the touch electrodes is electrically connected with all of the at least one redundant line stacked with said each of the touch electrodes,
    wherein at least one of the touch electrodes has a first opening, the first opening at least partially overlaps with an orthographic projection of the at least one of the touch signal lines on said at least one of the touch electrodes.

2. The in-cell touch substrate of claim 1, wherein the redundant lines and the touch signal lines are provided in a same layer.

3. The in-cell touch substrate of claim 1, wherein a second insulation layer is provided between said each of the touch electrodes and the at least one redundant line stacked with said each of the touch electrodes, said each of the touch electrodes is electrically connected with all of the at least one redundant line stacked with said each of the touch electrodes through a second via hole in the second insulation layer.

4. The in-cell touch substrate of claim 3, wherein said each of the touch electrodes is electrically connected with each of the at least one redundant line stacked with said each of the touch electrodes through multiple second via holes in the second insulation layer.

5. The in-cell touch substrate of claim 1, wherein said each of the touch electrodes is electrically connected with the one of the at least one of the touch signal lines stacked with said each of the touch electrodes through multiple first via holes in the first insulation layer.

6. The in-cell touch substrate of claim 1, wherein all of the redundant lines and the touch signal lines are parallel to a first direction.

7. The in-cell touch substrate of claim 6, wherein said each of the touch electrodes corresponds to multiple columns of pixels, and each column of the multiple columns of pixels includes a plurality of pixels provided along the first direction.

8. The in-cell touch substrate of claim 7, wherein said each column of the multiple columns of pixels corresponding to said each of the touch electrodes corresponds to one of the at least one of the touch signal lines stacked with said each of the touch electrodes or corresponds to one of the at least one redundant line stacked with said each of the touch electrodes.

9. The in-cell touch substrate of claim 1, wherein at least one of the touch electrodes has a second opening, the second opening at least partially overlaps with an orthographic projection of the at least one redundant line on said at least one of the touch electrodes.

10. The in-cell touch substrate of claim 1, wherein the in-cell touch substrate is an array substrate of a liquid crystal display panel.

11. A display panel, comprising the in-cell touch substrate of claim 1.

12. A method for driving the in-cell touch substrate of claim 1, comprising steps of:
    during a display stage, applying a common electrode signal to the touch signal lines; and
    during a touch stage, applying a touch driving signal to the touch signal lines.

13. The in-cell touch substrate of claim 1, wherein an orthographic projection of each of the plurality of touch signal lines overlaps all the touch electrodes in a single column and said each of the plurality of touch signal lines connects to only one of the touch electrodes in the single column.

* * * * *